United States Patent
Engel

(10) Patent No.: US 9,283,807 B2
(45) Date of Patent: Mar. 15, 2016

(54) SINUSOIDAL WHEEL

(71) Applicant: Michael Engel, Etobicoke (CA)

(72) Inventor: Michael Engel, Etobicoke (CA)

( * ) Notice: Subject to any disclaimer, the term of this patent is extended or adjusted under 35 U.S.C. 154(b) by 93 days.

(21) Appl. No.: 14/254,346

(22) Filed: Apr. 16, 2014

(65) Prior Publication Data

US 2015/0298501 A1 Oct. 22, 2015

(51) Int. Cl.
*B60B 15/00* (2006.01)
*B60B 19/00* (2006.01)
*B60B 1/00* (2006.01)
*B60B 21/00* (2006.01)

(52) U.S. Cl.
CPC . *B60B 19/00* (2013.01); *B60B 1/00* (2013.01); *B60B 21/00* (2013.01); *B60B 2900/551* (2013.01)

(58) Field of Classification Search
CPC ...... B60B 19/00; B60B 19/12; B60B 19/125; B60B 1/00; B60B 21/02; B60B 21/021; B60B 21/023; B60B 21/026; B60B 21/00
USPC .......................... 301/5.1, 41.1, 53, 55, 95.101
See application file for complete search history.

(56) References Cited

U.S. PATENT DOCUMENTS

| | | | | | |
|---|---|---|---|---|---|
| 740,035 | A | * | 9/1903 | Nichols et al. | B60B 15/02 301/41.1 |
| 907,991 | A | * | 12/1908 | Goodfellow | B60B 15/26 301/41.1 |
| 1,156,676 | A | * | 10/1915 | Ferriss | B60B 15/02 301/41.1 |
| 1,876,628 | A | * | 9/1932 | Dawe | B60S 1/68 172/546 |
| 3,418,960 | A | * | 12/1968 | Nelson | B60B 15/00 180/7.2 |
| 3,561,821 | A | * | 2/1971 | Pellegrino | B60C 7/00 152/334.1 |
| 4,674,757 | A | * | 6/1987 | Martin | B62B 5/026 180/7.1 |

* cited by examiner

*Primary Examiner* — John Walters
(74) *Attorney, Agent, or Firm* — Elias Borges

(57) ABSTRACT

An improved wheel is disclosed which is capable of traversing small obstacles easily without having to mount over the obstacle. The wheel design includes a wheel hub having an axis of rotation and a wheel rim coupled to the hub by a plurality of spokes. The wheel rim is formed in the shape of an annular sinusoidal wave having a plurality of alternating crests and troughs extending away from a center line by an amplitude. The wheel rim is configured such that the spokes couple to the rim at the center line at an intersection of the crests and troughs. The spokes are separated from each other by a space extending from the wheel rim to the hub.

11 Claims, 4 Drawing Sheets

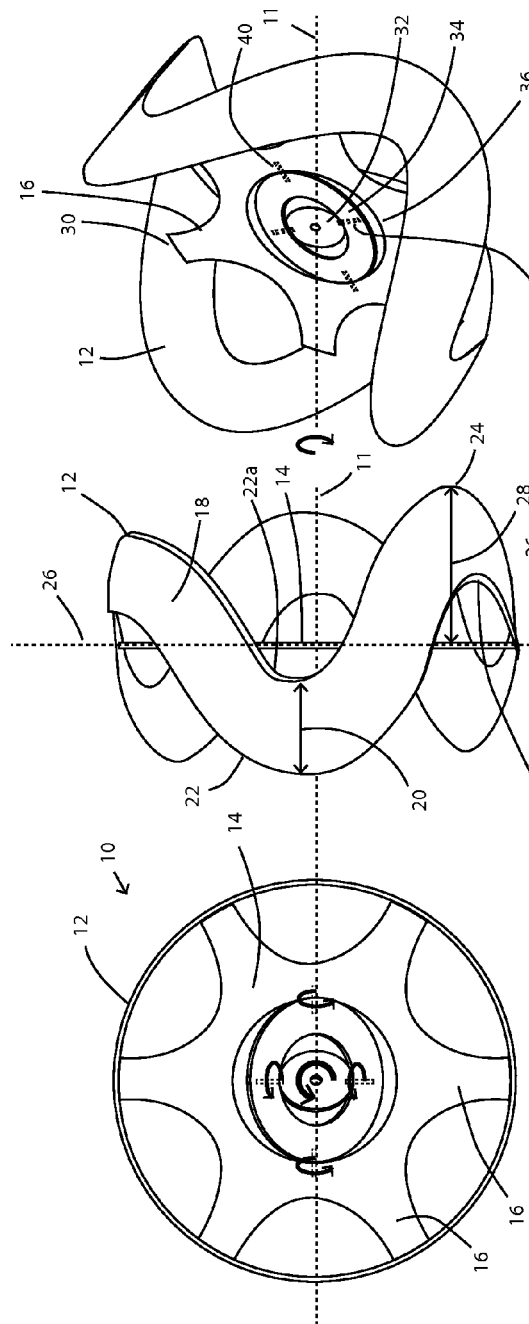
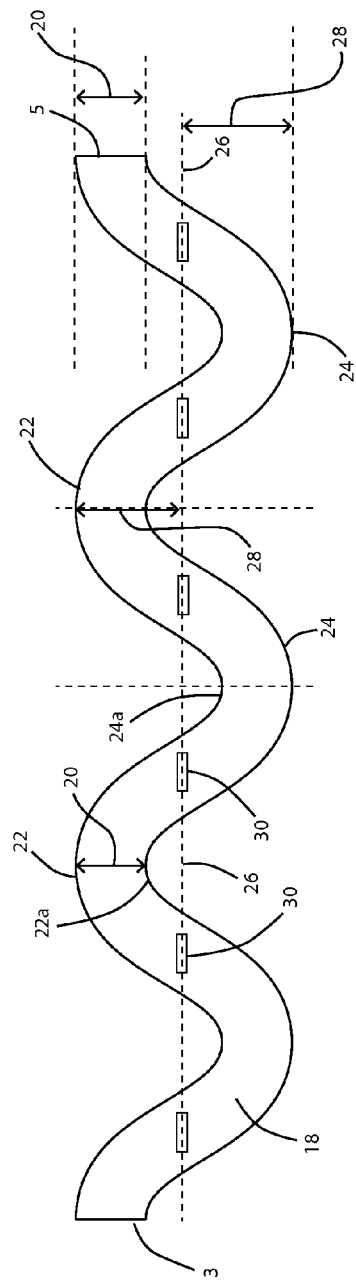

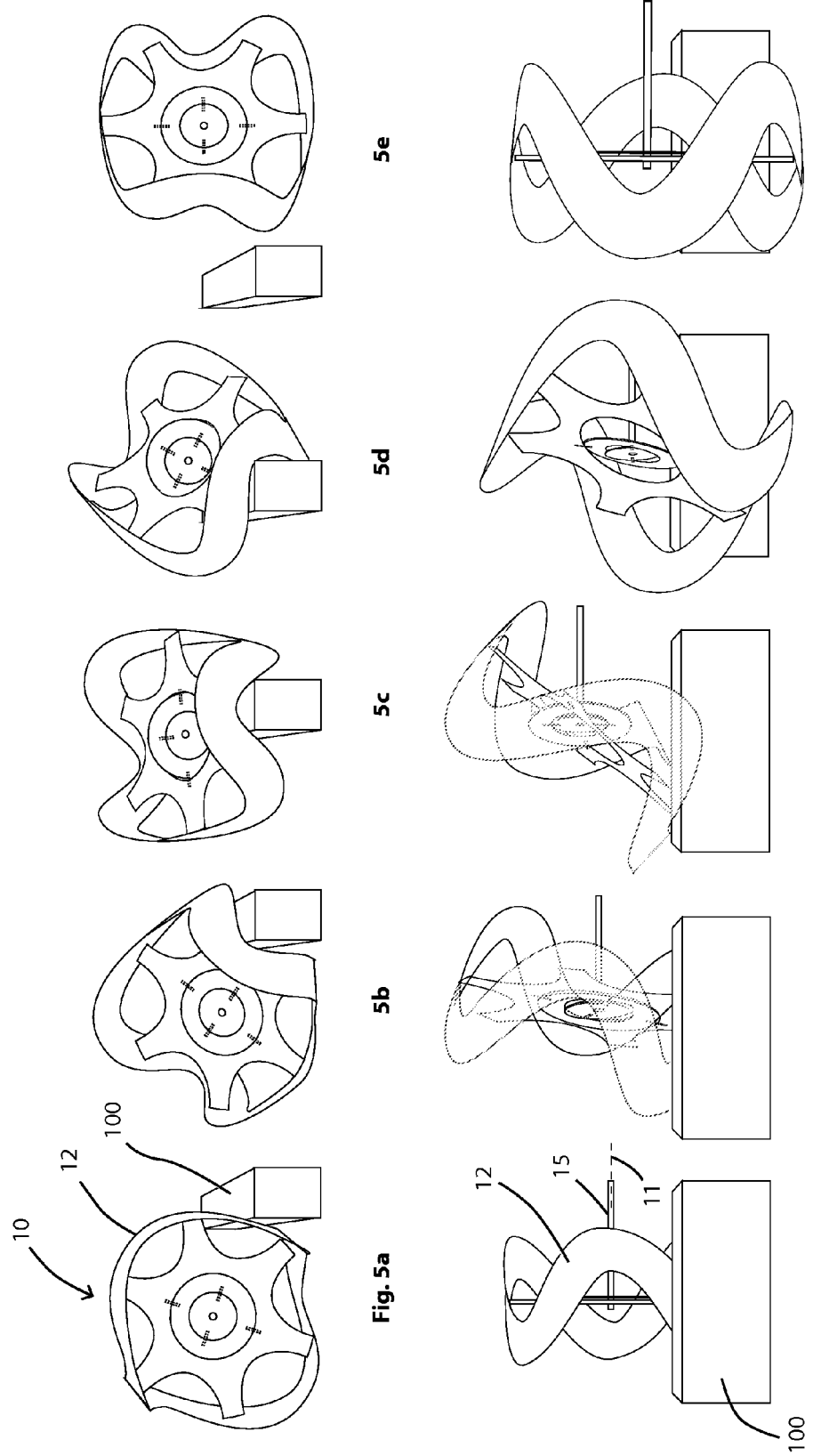

Three Supports

Six Supports

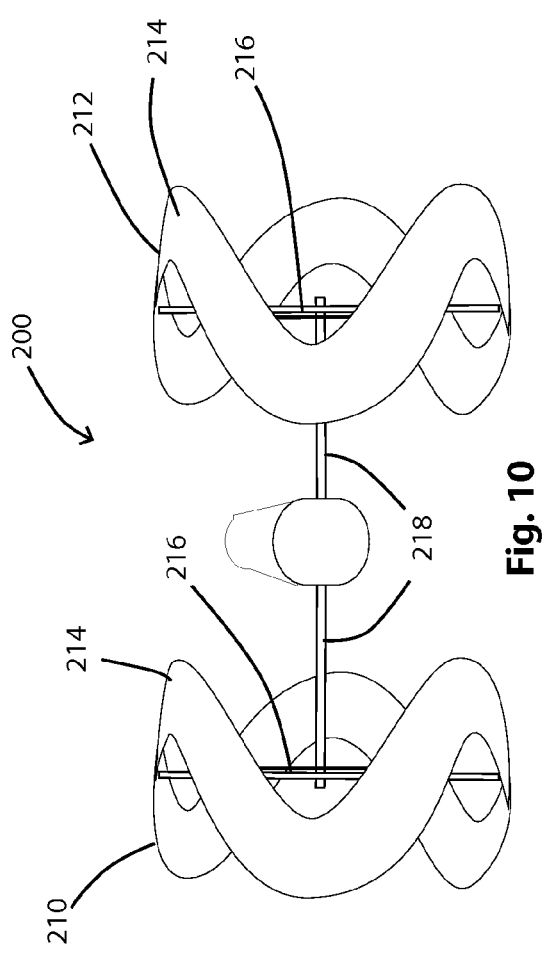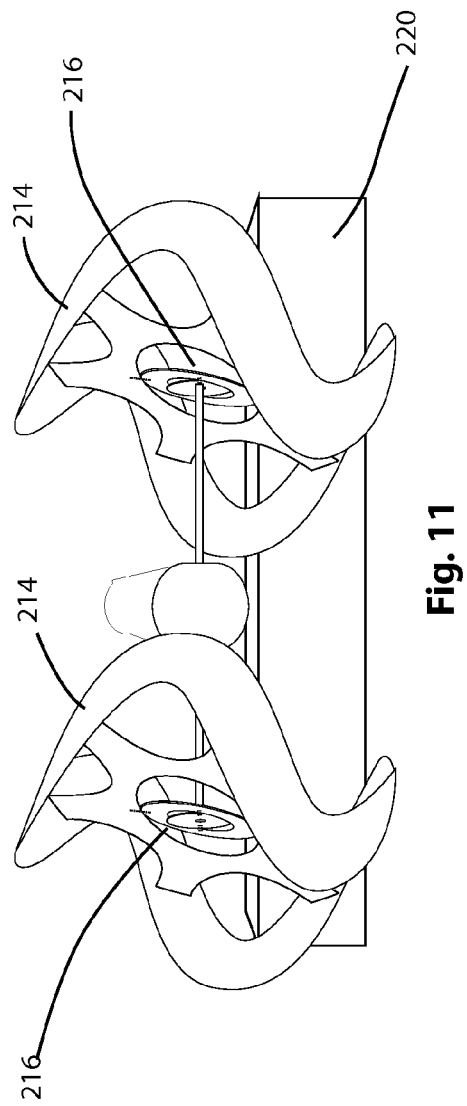

SINUSOIDAL WHEEL

FIELD OF THE INVENTION

The invention relates generally to wheels for traversing rough terrain.

BACKGROUND OF THE INVENTION

The basic function of the wheel has remained unchanged for centuries. Wheels are generally designed to propel a device in a direction dictated by the direction of the rotation of the wheel. Generally, a smooth, regular and even surface is required for the proper function and smooth running of the wheel.

Many prior attempts have been made (see prior art) to improve the wheels ability to overcome common obstacles such as stairs, curves, and rugged terrain. The most common approach has been to arrange multiple wheels in a circular fashion. All of the wheels are able to rotate around a common centre, when the wheel encounters a regularly shaped obstacle. All these wheels are rotating in the same plain. Although the prior art serves the basic function of allowing the wheel to mount a curve or ascend stairs the action is a hit, stop and then roll kind of movement. Essentially the wheel hits the obstacle and stops before the next wheel can be rotated around to make contact with the next elevation. This is not a smooth transfer from wheel to wheel. This approach also limits the size of the wheels as multiple wheels are needed. Therefore, what is required is a wheel design which permits the wheel to overcome obstructions in an entirely different way.

SUMMARY OF THE INVENTION

In accordance with one aspect of the present invention, there is provided an improved wheel design which is capable of traversing small obstacles easily without having to mount over the obstacle. The wheel design includes a wheel hub having an axis of rotation and a wheel rim coupled to the hub by a plurality of spokes. The wheel rim is formed in the shape of an annular sinusoidal wave having a plurality of alternating crests and troughs extending away from a center line by an amplitude. The wheel rim is configured such that the spokes couple to the rim at the center line at an intersection of the crests and troughs. The spokes are separated from each other by a space extending from the wheel rim to the hub.

In accordance with another aspect of the present invention, there is provided a drive train for driving a load over rough terrain, the drive train including first and second wheels in locked rotational relationship with each other. Each wheel has a wheel hub and a wheel rim. The wheel rim being formed in the shape of an annular sinusoidal wave having a plurality of alternating crests and troughs extending away from a center line by an amplitude. The wheel rim is configured such that the spokes couple to the rim at the center line at an intersection of the crests and troughs. The wheels are configured such that the first and second wheels are biased towards parallel rotational planes. The wheel hubs are configured to pivot such that the first and second wheels can pivot out of the parallel rotational planes.

In accordance with another aspect of the present invention, there is provided wheel configured to traverse small obstacles with ease, the wheel including a wheel hub having an axis of rotation and a wheel rim coupled to the hub by a plurality of spokes. The wheel rim is formed in the shape of an annular sinusoidal band having a plurality of alternating crests and troughs extending away from a center line by an amplitude, the band having a width less than the amplitude. Finally, the wheel rim is configured such that the spokes couple to the rim at the center line at an intersection of the crests and trough.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 1 is side view of a wheel made in accordance with the present invention showing the hub portion at an angle from the rotational plane of the wheel.

FIG. 2 is a front view of the wheel shown in FIG. 1 showing the hub portion in the same plane as the rotational plane of the wheel.

FIG. 3 is an isometric view of the wheel shown in FIG. 1 showing the parts of the hub portion.

FIG. 4 is a top view showing the ban portion of the rim portion of the wheel shown in FIG. 1.

FIGS. 5*a* through 5*e* are side views showing a wheel made in accordance with the present invention traversing over an obstacle.

FIG. 6*a* through 6*e* are front views showing the wheel of FIG. 5 traversing over the obstacle shown in FIGS. 5*a* through 5*e*.

FIG. 10 is a front view of a drive train made in accordance with the present invention.

FIG. 11 is a front view of the drive train of FIG. 10 traversing an obstacle.

In the drawings like characters of reference indicate corresponding parts in the different figures.

DETAILED DESCRIPTION OF THE INVENTION

Figure 9:
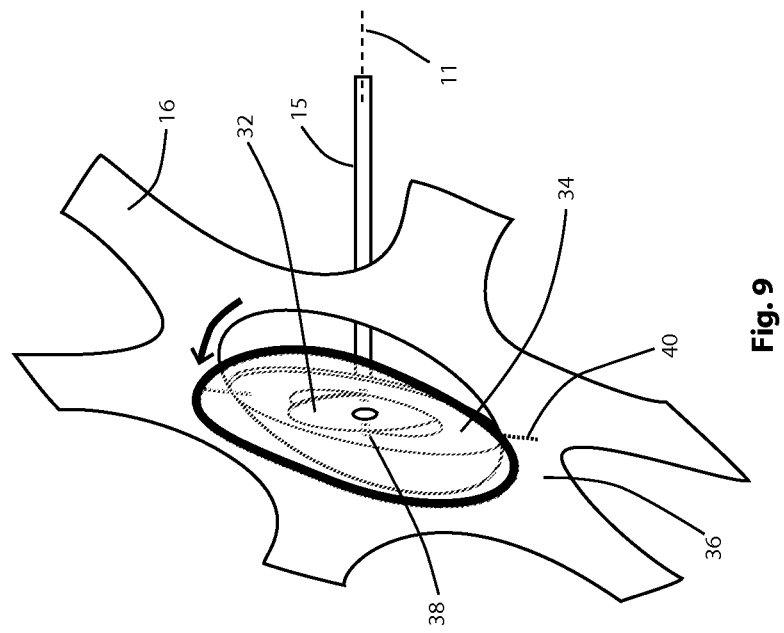
FIG. 9 is an isometric view of the hub portion of a wheel made in accordance with the present invention.

Referring to FIG. 1, the present invention consists of a wheel, shown generally as item 10, which consists of a rim 12 mounted to a hub portion 14 via a plurality of spokes 16. As seen in FIG. 2, rim 12 consists of a sinusoidal shaped band 18 having a width 20 and having a plurality of alternating crests 22 and troughs 24 which extend away from a center line 26 by an amplitude 28. Width 20 is less than amplitude 28 so that an inner lip 22*a* of each crest and an inner lip 24*a* of every trough is spaced away from center line 26 so as to leave a space wherein an obstacle may pass. Hub 14 has a rotational axis 11 which is the natural rotational axis of the hub.

As best seen in FIG. 3, hub portion 14 includes an inner (or central) hub portion 32, a middle portion 34 surrounding the central/inner hub portion 32 and an outer hub portion 36 surrounding the middle portion. Central hub portion 32 has the rotational axis 11, while middle portion 34 is pivotally coupled to central hub portion 32 at a first pivotal axis 38 and the outer hub portion 36 is pivotally coupled to middle portion 34 at a second pivotal axis 40. Pivotal axis 36 and 38 are 90° from each other, and rotational axis 11 is 90° from both axis 36 and 38. Essentially, hub portions 32, 34 and 36 form a universal joint (U joint) allowing wheel rim 12 to pivot into a plurality of different positions.

Figure 8:
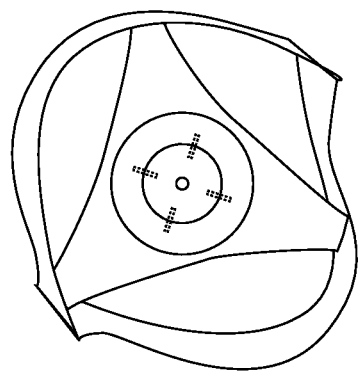
FIG. 8 is a side view of a wheel made in accordance with the present invention having only three spokes.
Figure 7:
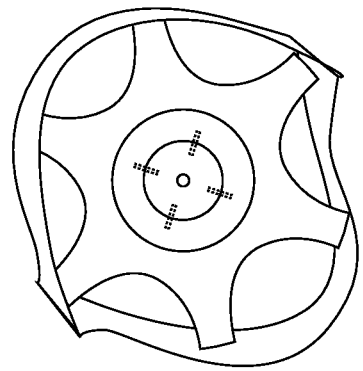
FIG. 7 is a side view of a wheel made in accordance with the present invention having six spokes.

As best seen in FIG. 4, band 18 consists of a ribbon of rigid material which is in the shape of a sinusoidal wave which is joined at opposite ends 3 and 5 to form wheel rim 12. Crests 22 and troughs 24 are formed on band 18 and are spaced away from center line 26 by amplitude 28. As mentioned above, band 18 has a width 20 which is less than amplitude 28 so as to leave spaces between the center line 26 and inner lips 22*a* and 24*a*. Spokes 16 attach to band 18 at the intersection points 30 on the center line 26 which are formed at the junction of the crests and troughs. In the example shown in FIGS. 1 through 4, band 18 has a "wavelength" of three, meaning it has three pairs of troughs and crests; therefore, there are six intersection points 30. The preferred number of spokes for the particular embodiment shown in FIGS. 1 through 4 is therefore six. However, it is possible to build a wheel in accordance with the present invention which has a "wavelength" of either more or less than three, in which case the number of intersecting points will be either more or less than six, respectively. Furthermore, it is possible to attach a spoke to the rim at every intersecting point (as seen in FIG. 7) or at every other intersecting point, therefore making a wheel with only three spokes (as seen in FIG. 8).

Referring now to FIG. 9, central hub portion 32 has a rotational axis 11. For the wheel to operate, central hub portion 32 will be rotatably mounted to an axel 15 which is coaxial with the axis of rotation. Essentially, middle portion 32 of the hub is perpendicular to axel 15 and axis of rotation 11. Middle portion 34 is pivotally attached to central portion 32 by axis 38 and outer portion 36 is pivotally attached to middle portion 34 by axis 40. Preferably, portions 32, 34 and 36 are configured such that they are biased into an aligned position where all three are co-planar so that the wheel maintains a rotation in the same plane (a rotational plane) which is perpendicular to the axis of rotation 11. This aligned position (or orientation) can be seen in FIGS. 2 and 6*a* where there is a plane of rotation wherein the wheel rim and the parts of the hub are all on the same plane. In this aligned position, first pivotal axis 36 and second pivotal axis 38 are co-planar (i.e. in the same plane). Since the various parts of the hub are configured to form a flexible connection between the central hub portion and the rim, it is possible for the wheel, and in particular the wheel rim, to pivot out of this aligned position and into a plurality of other positions. Hence, as seen in FIGS. 5*c* and 6*c*, the wheel can be pivoted into a position wherein the wheel rim is at an angle from the axis of rotation of the hub. Preferably, springs or resilient members can be incorporated into pivotal axis 36 and 38 so as to bias the wheel into its aligned orientation.

Alternatively, it is possible to build hub 14 as a single piece of deformable yet resilient material such as rubber or elastic plastic which would naturally bias the wheel into the position wherein the axis of rotation for the entire wheel is aligned with the axis of rotation of the hub (i.e. the rotational axis of the wheel is perpendicular to the axis of rotation of the hub), but yet the wheel could be forced into a plurality of positions wherein the rotational plane of the wheel (particularly the rim of the wheel) is not perpendicular to the rotational axis of the hub. A disc of this resilient and flexible material could be used to form a continuous piece extending from the hub to the spokes. Several suitable rubber and plastic compositions exist for making a one piece hub having the property of biasing the wheels rotational plane into a perpendicular orientation relative to the axis of rotation of the hub yet allowing the wheels rotational plane to be moved out of the perpendicular angle with respect to the rotational axis of the hub. It is possible that the same resiliently flexible material could be used to form both the hub and the spokes—provided the structure of the hub and spokes allowed for pivotal movement out of the aligned position and biasing towards the aligned position.

On a level surface a wheel made in accordance with the present invention behaves much like a standard circular wheel. To better understand how this invention responds to an obstacle please refer to FIGS. 5*a* through 5*e* and FIGS. 6*a* through 6*e*. From FIGS. 5*a* and 6*a*, we can see that as the wheel encounters an obstacle 100 the sinusoidal rim 12 catches on the obstacle 100. The primary rotation of the wheel continues in its original direction. This forward movement causes the wheel to pivot on its hub out of the aligned position as seen in FIGS. 5*a* and 6*a* and into a position wherein the plane of rotation of the wheel is at an angle from axis 11 and axel 15. The primary momentum of the wheel causes the wheel, which is now pivoted out of its aligned position, to essentially tumble over obstacle 100 (see FIGS. 5*b* and 6*b* to FIGS. 5*d* and 6*d*). The interior curve of the sinusoidal member steps smoothly over or on to the obstacle. The unique combination of the sinusoidal rim and the pivoting hub allow the pivoting, and recovering action to happen smoothly. The wheel simply roles along the continuous curve of the sinusoidal rim regardless of the angle it has pivoted too as it continues in its original direction as dictated by the primary direction of rotation. Once the wheel is again on an even surface and there is no longer pivoting pressure on the sinusoidal rim, the wheel recovers to its original aligned orientation (FIG. 5*e* and FIG. 6*e*). This recovery is aided by the means of biasing the wheel into its aligned position.

Referring now to FIGS. 10 and 11, a pair of wheels made in accordance with the present invention, namely wheels 210 and 212 can be combined to form a drive train 200 wherein the wheels have a common axis of rotation (either in the form of a continuous axel as illustrated or by separate aligned axels). Wheels 210 and 212 are preferably held in locked rotational relationship so that as one wheel rotates, the other wheel rotates in the same way. Wheels 210 and 212 are also preferably aligned so as to be "in phase" meaning that the crests and troughs of the two wheels are horizontally aligned. Wheels 210 and 212 are identical to the wheels discussed previously and each includes a sinusoidal rim 214 and a rotating hub portion 216 which biases the wheels into an aligned position wherein the wheels are biased towards parallel rotational plains oriented perpendicular to the axis of rotation 218. Hubs 214 of each wheel also has the ability to permit the rim portion of the wheel to pivot relative to the rotational axis of the hub (i.e. pivot away from being perpendicular to axis 218). As discussed above, when rim portions 214 of the wheels contact obstacle 220, the wheels can tilt out of their aligned positions as shown in FIG. 10 and into a pivoted position as shown in FIG. 11. In this pivoted position, the rotational plane of the wheels (particularly of the rim of the wheels) is not perpendicular to the axis of rotation of the hubs (axis 218), allowing the rim to traverse obstacle 220 easily.

Several factors ensure the smooth functioning of the wheel. The larger the interior curve (22*a* and 24*a* of FIG. 2) the larger the obstacle it can overcome. To accommodate this, the width 20 of the sinusoidal member may be reduced. In addition the interior curve (22*a* and 24*a*) must pass centerline 26 of the wheel. In the current embodiment, the sinusoidal member is made of a durable, somewhat flexible material such as plastic or rubber. Other materials may also be used separately or in conjunction, in order to improve grip or function. Additionally, a surface texture on the edge of the sinusoidal member, may also aid in gripping surfaces. Preferably, the sinusoidal member is made with a rounded or oval cross section to allow the wheel to roll from a primary surface at the center of the sinusoidal member to the edge of the sinusoidal member and back seamlessly.

The unique combination of the sinusoidal rim and the pivoting hub allows the wheel to smoothly traverse obstacles better than a standard wheel. As pressure due to an irregular surface or obstacle is applied to the sinusoidal rim, the hub pivots in the appropriate direction allowing the wheel to traverse the irregularities on the surface with fewer bumps and less jarring on the axel. These wheels can be of particular benefit on robotic or autonomous devices designed to traverse rough terrain; however, if suitable biasing means are adopted, even larger vehicles capable of carrying people can be built using the wheels of the present invention.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims Therefore, what is claimed is:

1. A wheel comprising:
   a. A wheel hub having an axis of rotation;
   b. A wheel rim coupled to the hub by a plurality of spokes;
   c. The wheel rim being formed in the shape of an annular sinusoidal wave having a plurality of alternating crests and troughs extending away from a center line by an amplitude;
   d. The wheel rim being configured such that the spokes couple to the rim at the center line at an intersection of the crests and troughs;
   e. The spokes being separated from each other by a space extending from the wheel rim to the hub;
   f. wherein the annular sinusoidal wave forming the wheel rim has a width, the width being less than the amplitude, and
   g. wherein the hub and spokes are configured to bias the wheel towards a rotational plane oriented perpendicularly to the axis of rotation of the hub, the hub and spokes being further configured to permit the wheel to pivot into a plurality of rotational planes which are not perpendicular to the axis of rotation of the hub.

2. The wheel of claim 1 wherein the hub is configured to have a first and a second pivotal axis, both the first and second pivotal axis being 90° from each other and 90° from the axis of rotation, the hub being configured to bias the wheel towards a rotational plane.

3. The wheel of claim 1 wherein the hub includes a central portion and a middle portion surrounding the central portion and wherein an outer portion surrounds the middle portion, the axis of rotation passing through the central portion, the middle portion being pivotally coupled to the central portion at a first pivotal axis positioned 90° from the axis of rotation, the outer portion being pivotally coupled to the middle portion at a second pivotal axis, 90° from both the axis of rotation and the first pivotal axis.

4. The wheel of claim 3 wherein the hub is configured to bias the middle and outer portions into an aligned position wherein the first and second pivotal axis are in the same plane.

5. The wheel of claim 1 wherein the spokes each have a length, the length of each spoke being substantially equal to the amplitude.

6. The wheel of claim 1 wherein the wheel further comprises an annular portion surrounding the hub and coupling the spokes to the hub and wherein the hub is coupled to the annular portion by a universal joint, the universal joint being configured to bias the annular portion into a perpendicular position relative to the axis of rotation.

7. The wheel of claim 1 wherein the hub and spokes are configured to bias the rim into a coaxial position wherein the rim is perpendicular to the axis of rotation, the hub and spokes being further configured such that the rim can be pivoted out of the coaxial position into a plurality of positions wherein the rim is not perpendicular to the axis of rotation.

8. The wheel of claim 1 wherein the rim has a rotational plane and wherein the hub and spokes are configured to bias the rim into a coaxial position wherein the rotation plane of the rim is perpendicular to the axis of rotation of the hub, the hub and spokes being further configured such that the rim can be pivoted out of the coaxial position into a plurality of positions wherein the rotational plane of the rim is not perpendicular to the axis of rotation of the hub.

9. A drive train for driving a load over rough terrain, the drive train comprising:
   a. First and second wheels in locked rotational relationship with each other, each wheel having a wheel hub;
   b. Each wheel having a wheel rim formed in the shape of an annular sinusoidal wave having a plurality of alternating crests and troughs extending away from a center line by an amplitude;
   c. The wheel rim being configured such that the spokes couple to the rim at the center line at an intersection of the crests and troughs;
   d. The wheels being configured such that the first and second wheels are biased towards parallel rotational planes;
   e. The wheel hubs being configured to pivot such that the first and second wheels can pivot out of the parallel rotational planes.

10. The drive train of claim 9 wherein each of the wheel hubs have a rotational axis, the wheels each being configured to bias the wheels into a coaxial position wherein the parallel rotational plane of the wheel is positioned perpendicular to the rotational axis of that wheel's hub, the hubs and spokes being configured to permit each wheel to pivot out of the coaxial position into a plurality of positions wherein the rotational plane of the wheel is not perpendicular to the rotational axis of that wheel's hub.

11. The drive train of claim 9 wherein the first and second wheels are aligned such that the crests and troughs of the two wheels are horizontally aligned.

* * * * *